Figures 1, 2:
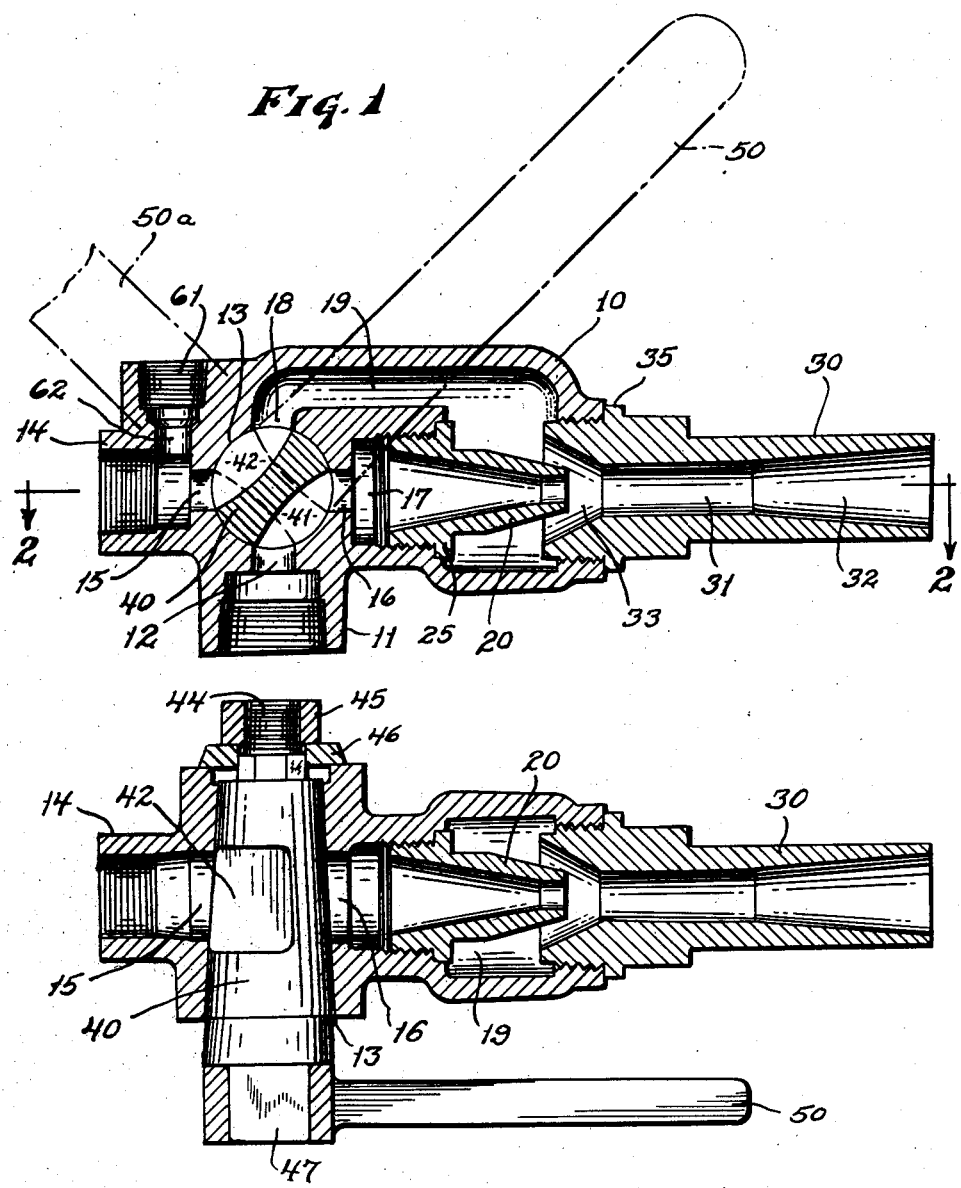

July 13, 1948. W. SHALLENBERG 2,445,246
JET AND VALVE ASSEMBLY
Filed Jan. 31, 1946 2 Sheets-Sheet 1

INVENTOR.
WALTER SHALLENBERG
BY
Bates, Teare, & McBean
ATTORNEYS

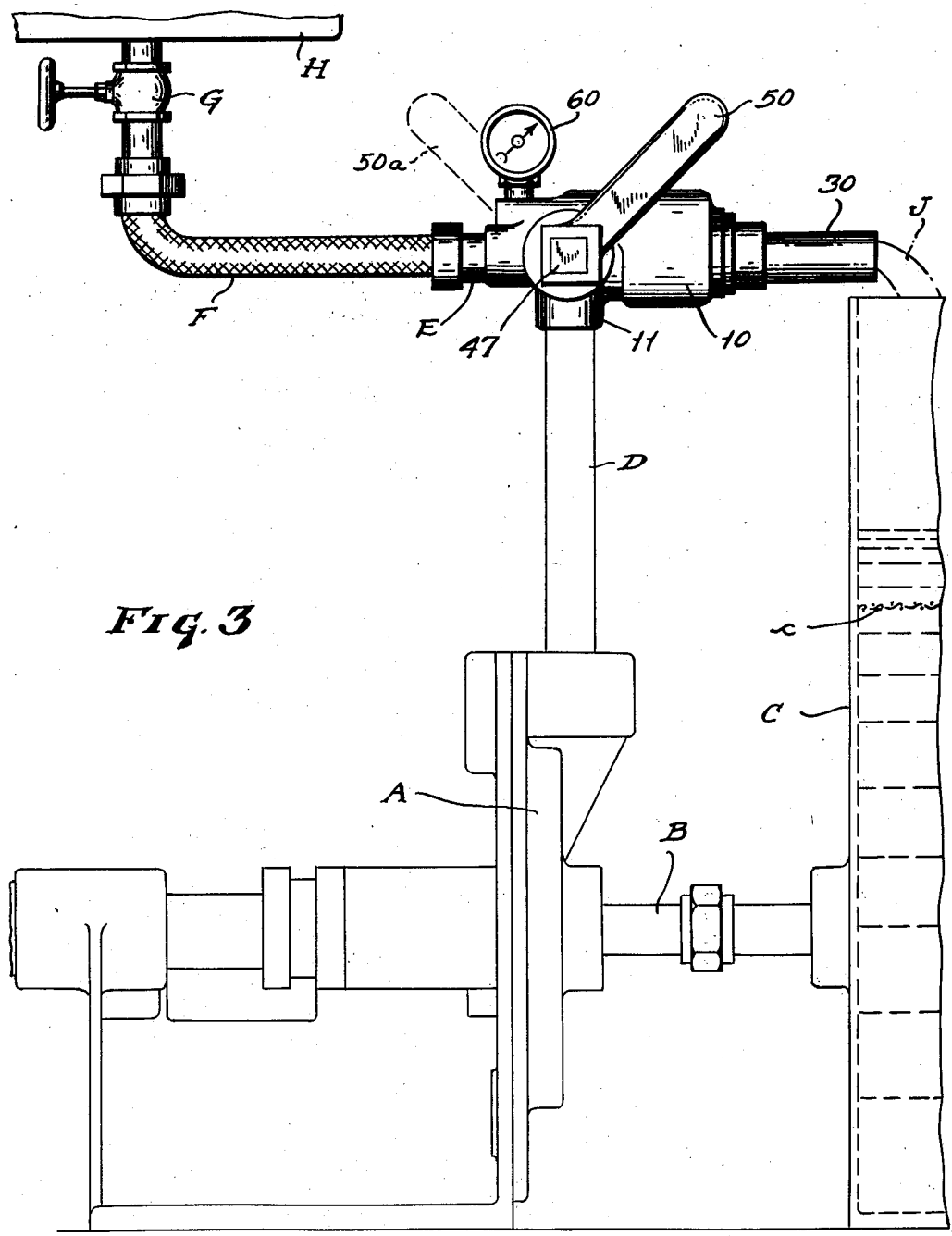

Patented July 13, 1948

2,445,246

UNITED STATES PATENT OFFICE 2,445,246

JET AND VALVE ASSEMBLY

Walter Shallenberg, Salem, Ohio, assignor to The Deming Company, Salem, Ohio, a corporation of Ohio Application January 31, 1946, Serial No. 644,585

11 Claims. (Cl. 103—262)

This invention relates to a jet and valve assembly suitable for drawing fluid from a conduit by means of a jet nozzle connected with a source of fluid under pressure and also suitable by a mere change in the position of the valve for forcing fluid through said conduit. My jet and valve assembly is very useful, for instance, in coupling a container with a pump so that the pump, forcing liquid through the jet, may operate to exhaust the container and then by direct transmission consequent upon the change of the valve may fill the container. My invention is illustrated in the drawings hereof and hereinafter more fully described and the essential novel features are set out in the claims.

In the drawings, Fig. 1 is a vertical section through the jet and valve assembly, the operating handle not appearing in this view but being indicated by broken lines in either of two operative positions; Fig. 2 is a horizontal section of the assembly on the line 2—2 of Fig. 1 looking downwardly; Fig. 3 is a diagrammatic view showing the jet and valve assembly in side elevation and coupled with a pump and a suitable container and associated with a tank from which liquid may pass to the pump.

My assembly comprises a hollow body 10 carrying a nozzle 20 and a jet tube 30. Seated in the body, extending transversely thereof, is a rotative valve plug 40 preferably tapered to make a tight fit. This plug is of the four-way type coacting with four passageways in the body to couple them in two different pairs, as hereinafter explained.

The body 10 has a downwardly extending sleeve-like portion 11 internally threaded to receive a supply pipe and having a reduced portion 12 of its bore communicating with the conical transverse seat 13 occupied by the plug 40. There is also a longitudinal extension 14 of the body internally threaded and having its bore terminating in the reduced passageway 15 leading to the valve seat. A passageway 16 leads from the valve seat diametrically opposite the passageway 15 to an enlarged internally threaded bore 17 into which the nozzle 20 is screwed. Finally, a passageway 18, diametrically opposite the passageway 12, is connected by a passage 19 with an annular space in the body about the nozzle.

The jet tube 30 has a bore extending throughout its length and having an intermediate cylindrical portion 31, an outwardly flaring extreme portion 32, and an inwardly tapering entrance portion 33. The end of the nozzle 20 extends into the conical recess 33. The tube is screwed into the end of the body, making a substantially tight fit therewith, and preferably has a flange 35 abutting the end of the body. The nozzle is likewise screwed into position in the body and has an external flange 25 abutting the end of the tubular seat within the body which the threaded portion of the nozzle occupies. The external diameter of the flange 25 is less than the internal diameter of the threaded end of the body which the tube occupies, so that in assembling the device the nozzle may be readily passed through the end opening of the body and tightened in position and thereafter the tube put in place.

The valve plug 40 is of the conical form and has two spaces 41 and 42 on its opposite sides which may effect the coupling of the differing internal ports leading from the valve seat. The plug is shown as having a threaded extension 44 on which screws a nut 45 bearing against a washer 46 which bears against the adjacent face of the body to hold the plug in position. At its other end the plug has a square shank 47 on which is mounted an operable handle 50.

When the parts are in the position shown in Figs. 1 and 2, the intake port 12 is coupled by the passageway 41 with the port 16, and the port 15 is coupled by the passageway 42 with the port 18. The result is that liquid, admitted through the bottom connection 11, is discharged through the nozzle 20 and this serves to draw fluid from any conduit connected to the horizontal extension 14 cause it to pass by the port 15, plug passage 42, port 18, through the body passage 19, and thence into the jet tube 30 to be discharged with the liquid forced through the jet.

Now if the handle 50 is tipped back 90° into the position indicated at 50a in Figs. 1 and 3, the partition of the valve plug assumes the position shown in broken lines in Fig. 1, with the result that the fluid under pressure is directed by the valve passage 42 to the port 15 and into any conduit connected therewith, while the two ports 16 and 18 (though coupled together) are shut off from either the supply through the bottom extension or the conduit connecting to the lateral extension 14.

It will be seen from the above explanation that my device allows the supply of fluid entering at the bottom of the assembly to be used either by the jet action to exhaust fluid from the conduit connected to the lateral extension or by direct action to supply fluid to such conduit.

Fig. 3 is in the nature of a diagram illustrating the action in the jet assembly. In this view, I have indicated a centrifugal water pump A receiving its supply at the eye of the impeller by a conduit B leading from a tank C, the pump being coupled by a discharge pipe D with the intake extension 11 of the assembly. The horizontal passageway to the assembly is shown in this view as connected by a coupling E with a conduit F leading (through a suitable shut-off valve G) to a container H. The jet tube 30 is indicated as overhanging the top of the tank C so that it may discharge liquid directly into the tank, which is shown as having a strainer or filter c within it above the pump connection B.

In operating the illustrative embodiment of Fig. 3 to exhaust the container H when its valve G is open, the handle 50 of the assembly is set in the full-line position shown in Fig. 3 and the pump operated to draw liquid from the tank C and force it through the jet, nozzle and jet tube, returning it to the tank. This action draws fluid from the container H through its shut-off valve G and conduit F and coupling E, thence through the body to pass through the jet tube and be discharged with the discharging liquid indicated at J.

When the container H has been exhausted, or as much so as desired, the handle 50 is thrown into the position 50a; then the continued fluid from the pump up the delivery pipe D passes directly through the coupling E, conduit F and open valve G to the container H. When the container has been thus properly filled, the closing of its valve G allows the disconnection of the exhausting and filling device for use with some other container, if desired.

It is to be understood that the parts in Fig. 3 designated by reference letters are selected merely to afford a clear description of the operation of my jet and valve assembly and may be varied greatly in practice.

As it is frequently desirable to know the degree of vacuum obtained in exhausting a container as well as the degree of pressure in filling it, I prefer to provide a combined vacuum and pressure gauge 60 (Fig. 3) connected to an internally threaded opening 61 (Fig. 1) in the body which has a reduced bore 62 communicating with the port 15. Accordingly, when the parts are in the position shown in Figs. 1, 2 and 3, and the pump is operating the jet to exhaust the container, the gauge 60 will show the amount of vacuum obtained in the container. On the other hand, when the handle is in the position 50a coupling the port 12 with the port 15, the gauge shows the pressure being supplied to the container.

I claim:

1. The combination of a hollow body, a nozzle mounted within the same, a jet tube carried by the body adapted to receive the discharge of the nozzle, a seat for a valve having a port communicating with the nozzle and a port communicating by a passage within the body with the space about the nozzle leading to the tube, means for connecting two conduits to the body, each conduit terminating in a port at the valve seat and valve means coacting with said seat adapted to couple the two conduits together or to couple one of the conduits with the nozzle and the other with the jet tube via said passage.

2. The combination of a hollow body, a nozzle mounted within the same, a jet tube carried by the body adapted to receive the discharge of the nozzle, a seat for a plug valve, said seat having four individual ports, namely, a port communicating with the nozzle, a port communicating with a space in the body about the nozzle leading to the tube, and two admission ports communicating with the exterior of the body and a four-way plug valve occupying said seat adapted to couple the two admission ports together or to couple one admission port with the nozzle and the other with the jet tube through the space about the nozzle.

3. The combination of a hollow body having a seat for a rotatable plug valve, said body having four ports substantially 90° apart leading from the valve seat, a nozzle within the body communicating with one port, a jet tube aligned with the nozzle and having an entrance space about the nozzle communicating with another port, means for coupling two conduits with the other two ports respectively, and a rotatable valve plug in the seat having two independent passages across it adapted in one position of the plug to couple the nozzle with one conduit and the jet tube with the other through the space about the nozzle and the other position of the plug to couple the two conduits together without either of them connected to the nozzle or jet tube.

4. A valve and jet assembly comprising a hollow body, a conical valve seat therein, means providing a relatively downward passage from the valve seat to the exterior, means providing a relatively lateral passage from the exterior to the valve seat, a nozzle within the body open at both ends, a jet tube carried by the body projecting therefrom and having its bore aligned with the discharge of the nozzle, the body having an internal space leading to the jet tube about the nozzle, said downward passage and lateral passage and nozzle and internal space all terminating in the conical valve seat, a valve plug occupying the seat and provided with passages adapted to couple the downward and lateral passages independently with the nozzle and jet tube via said internal space and in another position couple the downward and lateral passages with each other, and a handle on the valve plug.

5. A jet and valve assembly comprising a hollow body, an open-ended nozzle within the body, a jet tube open at each end carried by the body in alignment with the nozzle, said jet tube having its entrance space communicating outside of the nozzle with a hollow space in the body, two admission passageways leading from the exterior to the interior of the body, a four-way valve carried by the body adapted in one position to couple one admission passageway with the nozzle and the other with the jet tube via said hollow space and in the other position to couple the two admission passageways together, a passage leading to the exterior from one of said admission passageways, and a vacuum and pressure gauge connected with said passage.

6. The combination of a jet body, a fixed nozzle and a jet tube carried by the body in position with the nozzle discharging into the tube, two passageways to the body and valve means movably mounted in the body and adapted to couple one passageway with the nozzle, the other passageway with a passageway leading from the valve to the jet tube, or to couple together the two passageways first mentioned.

7. A fluid flow control device comprising a walled body, a chamber defined by the walls of said body having two inlets and an outlet therein, a passage formed in a wall of the body interconnecting the chamber and the outlet, flow constricting means in the outlet adjacent the outlet end of the passage, and a plug in said chamber, said plug being shiftable from one position in which one inlet is connected in fluid flow relation with the passage and the other inlet is contemporaneously connected with the outlet to another position in which the inlets are interconnected.

8. A fluid flow control device comprising a body, a main chamber in said body, an auxiliary chamber adjacent said main chamber, a Venturi outlet in the auxiliary chamber, a passage formed in the body for interconnecting the chambers, a flow constricting means in the auxiliary chamber having its outlet end adjacent the open end of the passage therein and disposed in substantial coaxial relation to the outlet, a pair of threaded bosses on said body for receiving fluid conduits, a plurality of ports in the main chamber, one being connected to each boss, one being connected to the passage and another to the flow constricting means, a rotatable plug in the main chamber for controlling the flow of fluid from the bosses into the main chamber and thence to the auxiliary chamber and its outlet through the passage and the flow constricting means respectively when the plug is in one position and from one boss to the other when in the other of its positions.

9. A fluid flow control device comprising a body, a main chamber in said body having a plurality of ports, a flow constricting means in one of the ports, a mixing chamber substantially enclosing the flow constricting means, a passage in the body interconnecting one of the ports in the main chamber and the mixing chamber and having its outlet adjacent the flow constricting means in said mixing chamber, and a rotatable plug in said main chamber for controlling the flow of fluid therethrough, said plug being shiftable from one of its positions to direct the flow of fluid through one of the ports into the mixing chamber and contemporaneously connecting another of the ports with the passage to another of its positions interconnecting two of the ports independently of the passage and the mixing chamber.

10. A fluid flow control device comprising a body, a main chamber in said body, an auxiliary chamber adjacent said main chamber, a plurality of ports in said main chamber, a passage connecting one of said ports with the auxiliary chamber, a flow constricting means connected to another of said ports disposed in the auxiliary chamber adjacent the open end of the passage, a Venturi outlet in the auxiliary chamber in substantial coaxial relation to and partially surrounding the flow constricting means, a rotatable plug in the main chamber for controlling the flow of fluid therethrough, said plug in one position connecting one port with the auxiliary chamber by means of the passage and contemporaneously connecting another port with the auxiliary chamber through the flow constricting means, while, in another position, diverting the fluid from one port to another and bypassing the passage and flow constricting means.

11. A fluid-flow control device comprising a body; a chamber in said body having therein an inlet, an outlet, and an additional port which serves alternately as an inlet and an outlet; a passage in the body interconnecting the chamber and the outlet; flow constricting means in the outlet adjacent the outlet end of the passage; and disposed in the chamber a plug which is shiftable from a position in which the inlet is connected in fluid-flow relation with the passage while the port is connected with the outlet to another position in which the inlet and the port are connected, all of said flow connections being made through the chamber.

WALTER SHALLENBERG.

REFERENCES CITED

The following references are of record in the file of this patent:

UNITED STATES PATENTS

| Number | Name | Date |
| --- | --- | --- |
| 338,710 | Burton | Mar. 30, 1886 |
| 954,270 | Eberman | Apr. 5, 1910 |
| 1,491,115 | Taylor | Apr. 22, 1924 |